United States Patent [19]

Bucher et al.

[11] Patent Number: 4,743,137
[45] Date of Patent: May 10, 1988

[54] TOOL HAVING A HARD METAL PART WITH A SOLDER AND LINING TYPE CONNECTION

[75] Inventors: Anton Bucher; Peter Simon, both of Rickenbach, Switzerland; Wilhelm King, Lauterbach, Fed. Rep. of Germany

[73] Assignee: Siku GmbH, Switzerland

[21] Appl. No.: 912,843

[22] Filed: Sep. 29, 1986

Related U.S. Application Data

[62] Division of Ser. No. 654,683, Sep. 26, 1984, Pat. No. 4,668,118.

[30] Foreign Application Priority Data

Sep. 26, 1983 [DE] Fed. Rep. of Germany ....... 3334815

[51] Int. Cl.⁴ ............................................. F16B 11/00
[52] U.S. Cl. .................... 403/268; 403/272; 403/229; 228/118; 228/132
[58] Field of Search ............... 403/272, 268, 271, 265, 403/270, 229; 228/132, 134, 118, 124, 189

[56] References Cited

U.S. PATENT DOCUMENTS

| | | | |
|---|---|---|---|
| 1,394,137 | 10/1921 | Blair | 403/268 |
| 2,848,594 | 8/1958 | Aversten | 403/272 X |
| 4,190,127 | 2/1980 | Wolf | 228/134 X |
| 4,196,485 | 4/1980 | Wilkinson | 403/268 X |
| 4,267,953 | 5/1981 | Hoffman et al. | 228/118 |
| 4,433,887 | 2/1984 | Sado et al. | 339/17 R |
| 4,582,243 | 4/1986 | Myer | 403/272 X |
| 4,594,053 | 6/1986 | Söhngen | 277/53 X |

FOREIGN PATENT DOCUMENTS

| | | |
|---|---|---|
| 136650 | 2/1934 | Fed. Rep. of Germany . |
| 804283 | 7/1949 | Fed. Rep. of Germany . |
| 751201 | 5/1953 | Fed. Rep. of Germany . |
| 970847 | 11/1958 | Fed. Rep. of Germany . |
| 203828 | 6/1959 | Fed. Rep. of Germany . |

*Primary Examiner*—Randolph A. Reese
*Assistant Examiner*—Peter M. Cuomo
*Attorney, Agent, or Firm*—Thomas W. Speckman

[57] ABSTRACT

This invention relates to a tool with at least one wear-resistant hard metal part which serves to process production pieces, stones, or the like, wherein the hard metal part is firmly connected with a metallic carrier by solder located in at least one solder aperture. In order to reduce the danger of formation of tension cracks in the hard metal part, the invention provides that at least one predetermined weak point is created in the solder aperture.

15 Claims, 3 Drawing Sheets

TOOL HAVING A HARD METAL PART WITH A SOLDER AND LINING TYPE CONNECTION

This is a divisional application of Ser. No. 654,683, filed Sept. 26, 1984, now U.S. Pat. No. 4,668,118.

BACKGROUND OF THE INVENTION

This invention concerns a tool with at least one wear-resistant hard metal part which serves to process production pieces, such as stone or the like, which is firmly connected to a metallic carrier by means of solder located in at least one soldering aperture between the hard metal part and the metallic carrier. Among such tools are bits, such as drill bits, turning tools, and the like and processing tools to remove shavings, from lathing, milling, and the like.

Hard metal has a substantially smaller coefficient of expansion than a carrier consisting mostly of steel. Even during the soldering of the hard metallic part to the carrier, strains arise between the hard metallic part and the carrier. Because of the forces and temperature increases which may occur during operation, the strain may increase still further, and often causes tension cracks in the hard metal part, and thus causes failure of the tool.

Using a soft solder to reduce the danger of the formation of tension cracks is known. This solder connection is, however, not sufficient in many cases, especially for high performance tools. Thus, hard solder is preferred.

The greater the cross section and length of the hard metal part, the greater is the danger of tension cracks in the hard metal part. Even in high performance tools, the hard metal part must be supported in the carrier over a large surface area, in order to be able to absorb the considerable forces and momentum.

SUMMARY OF THE INVENTION

It is an objective of this invention to create, by using a common hard solder, and in a tool of the type described above, a connection between the hard metal part and the carrier, whereby the danger of the formation of tension cracks in the hard metal part is substantially reduced.

This objective is achieved as specified by the invention in the following manner: at least one predetermined weak point is created within the soldering aperture.

Because of the at least one predetermined weak point created in the soldering aperture, the ability of the solder to transmit force, such as tension and/or compressive and/or shearing forces, is reduced, and thus the danger of the formation of tension cracks in the hard metallic part, can be practically eliminated in a simple, cost-effective, and reliable manner, while retaining firm support of the hard metallic part.

The predetermined weak point can be an opening or a cavity where the solder does not bind to a surface. An equalization of tension can occur in the area of this weak point.

In accordance with one embodiment, an opening in the soldering aperture can be created in a simple manner by having partial areas of the solder aperture walls formed by the hard metal part, and/or providing the carrier with a surface layer having partial areas which do not bind to the solder during soldering. The solder then abuts the solder aperture walls in the area of these weak points but does not, however, solidly bind to these.

A further embodiment for the formation of weak points is characterized as follows: at least one lining which is more variable in volume and more elastic than the solder, is positioned in the solder aperture. The volume change of the lining brings about an equalization of tension in the solder aperture. The equalization of tension can be further improved if the lining has, in its interior, at least one opening or cavity.

In bits, a bolt-shaped hard metal part is preferably soldered into a blind end bore of the carrier. For this type of tool, one embodiment has proven especially advantageous, namely, in a casing-like or a container-like solder aperture, having a ring, a casing, or a hollow spiral sealed at both ends, placed in the solder aperture as a lining.

An equalization of tension in the area of the lining is accomplished, in accordance with another embodiment, in that the lining is formed in multiple layers, and, between two layers, it forms a required weak point, with the layers being bound less solidly to one another than the solder is with the hard metal part and the carrier.

If the lining comprises non-solderable particles, grains, or the like, then a great number of openings form in the solder aperture on the surfaces.

To form further openings and thus weak points along the surfaces facing the solder, the lining may be bound to these only in the partial areas.

If the lining itself has a sufficient capacity for equalization of tension, then another embodiment provides that the lining is bound to the surfaces facing the solder. This facilitates the insertion of the solder and the production of the lining.

Another embodiment is characterized as follows: the solder aperture walls formed by the hard metal part and the carrier are connected with each other by means of individual solder bridges separated from each other by means of cavities. The cavities between the separated bridges form weak points in the solder aperture.

If the solder is a hard solder, preferably having a silver or copper base, then, despite the weak points in the solder aperture, a firm connection between the hard metal part and the carrier sufficient for high performance tools is obtained.

BRIEF DESCRIPTION OF THE DRAWING

The invention is illustrated more fully in the different embodiments depicted in the drawing, wherein.

DESCRIPTION OF PREFERRED EMBODIMENTS

Figure 1:
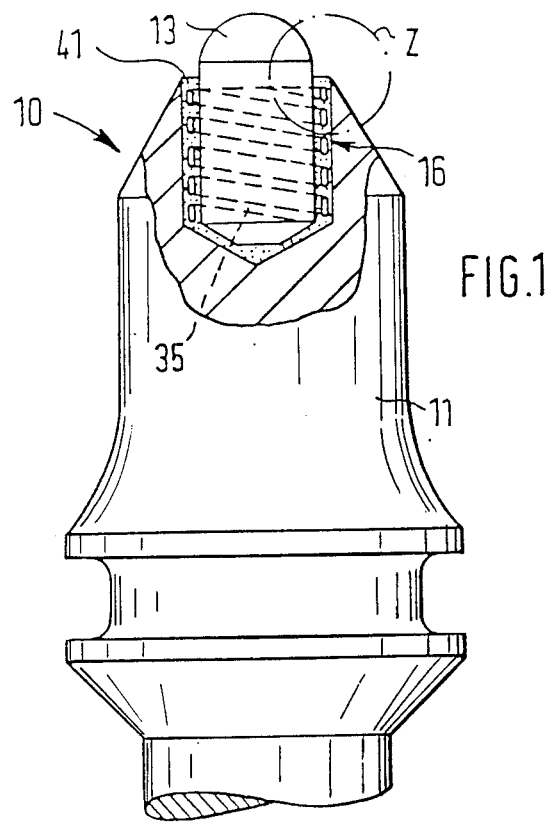
FIG. 1 shows a partially cut-away lateral view of a cylindrical bit.
Figure 2:
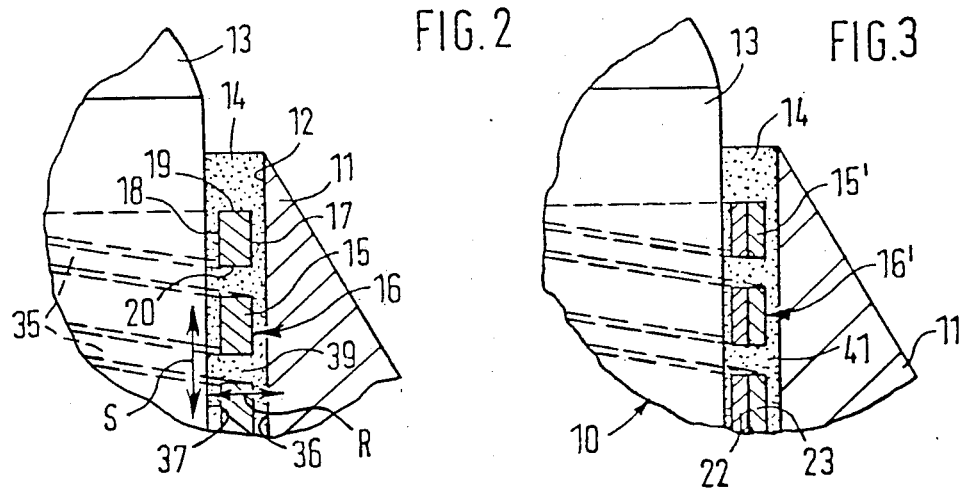
FIG. 2 shows enlarged cross section Z in FIG. 1.

The cylindrical bit (10) shown in FIGS. 1 and 2 has a rotationally symmetrical shaft, which on the forward front end, has a central bore formed as a blind-end hole, in which hard metal part (13) formed as a hard metal point is soldered by means of solder (14). The solder (14) is preferably a hard solder with a silver and/or copper base, with a melting point of between about 700° to 1100° C. The shaft serves as carrier (11) for the tool. Hard metal part (13) is encompassed by a lining (16) in central bore (12), which comprises a spiral helically coiled band (15), which is both axially and radially expansible and compressible. Solder aperture (41) between hard metal part (13) and central bore (12) in carrier (11) is filled with solder (14), so that the spiral is embedded. Metal band (15) has a rectangular cross section, in which the larger dimension is directed parallel to the longitudinal central axis of the hard metal part (13). The spiral extends 30 to 80 percent of the depth of the central bore (12).

The external and internal broad sides (17, 18) of metallic band (15) bear surface coatings, which do not bind to the solder (14), so that crack-like openings form on these surfaces as weak points in the solder aperture (41). This can be attained by alitizing the band (15). The narrow sides (19, 20) of band (15) do not bind to the solder (14). If, with large temperature increases, tensions are exerted on carrier (11) and hard metal part (13), then these are so reduced at the weak points that no tension cracks arise in hard metal part (13). The tensions function radially, that is, at right angles to the solder aperture (41), as tension or pressure (force R in FIG. 2), or along the solder aperture (41), axially or tangentially, as the force of gravity (S). The openings in the solder connection permit small displacements, which suffice to reduce these forces very sharply. Also, the malleability of the spirals facilitates equalization of the tension. The helical shape of the spiral forms an opening (35) which is filled by means of solder bridge (39), extending from the peripheral wall (36) of central shaft (12) to the periphery (37) of hard metal part (13).

Figure 3:
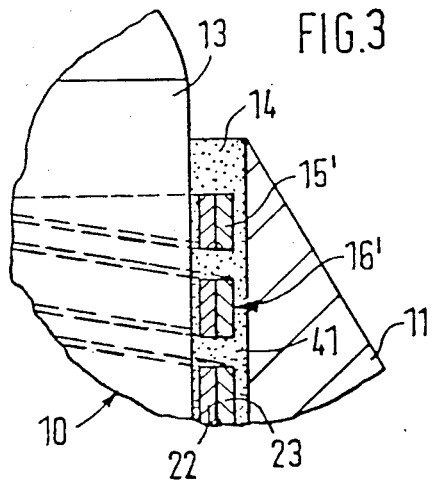
FIG. 3 shows the cross section Z of another embodiment showing a differently shaped cylindrical bit.

Cylindrical bit (10) depicted in FIG. 3 in cut-away portion, has lining (16'), which is likewise formed as a spiral. Metal band (15') comprises at least two layers (22, 23), which are less firmly connected to each other than the solder (14) is connected to lining (16'), carrier (11), and hard metal part (13). The surfaces of lining (16') which face the solder (14) can be completely or only partially bound to the solder (14), if lining (16') has areas which are not solderable. The solder (14) cannot penetrate between both layers (22, 23), so that this weak point is retained after embedding the spiral in the solder (14), and can equalize the tension, so that this connection between the two layers (22, 23) can partially loosen. The connection between layers (22, 23) represents a required weak point, which may give upon the appearance of tension.

Figure 4:
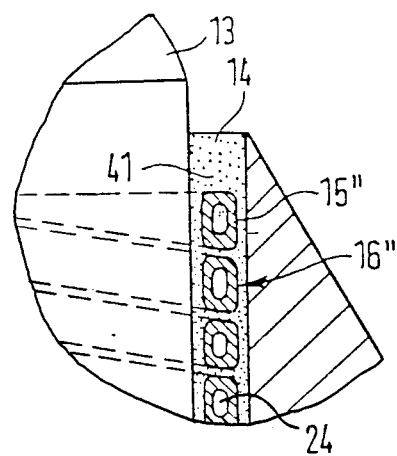
FIG. 4 shows the cross section Z of a third embodiment of a cylindrical bit.

In the embodiment of a cylindrical bit as shown in FIG. 4, from which, also, only section Z as specified in FIG. 1 is shown, line 16" is a spiral formed from metal tube 15", which is closed on both ends. The cavity (24) of the spiral creates a lining (16") which can change volume, and which is expansible and compressible. The surfaces of the spiral which face the solder (14) can completely bind to the solder (14), since the spiral can equalize the tension. The closed ends of the spiral impede the entrance of solder (14) into cavity (24), which is wrapped helically around the hard metal part (13). Metal tube (15") is a flat tube, the larger dimension of which is again directed parallel to the central longitudinal axis of the hard metal part (13).

Figure 5:
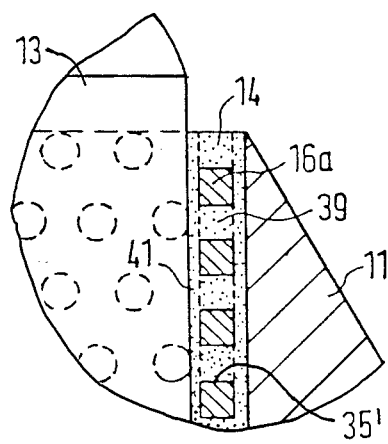
FIG. 5 shows the cross section Z of a fourth embodiment of a cylindrical bit.

In the embodiment of FIG. 5, lining (16a) is formed as a container, which is perforated in the base and in the container wall. The internal and the external surfaces of the container are provided with a non-solderable coating. Solder (14) penetrates through holes (35') of the container, to form solder bridges (39), and can moreover bind to the solder aperture walls. Solder aperture (41) can, again, through lining (16a), equalize tension, since the non-soldered surfaces of the lining form breaking points in the solder aperture (41), while solder bridges (39) ensure sufficient support of the hard metal part (13) in carrier (11).

Figure 6:
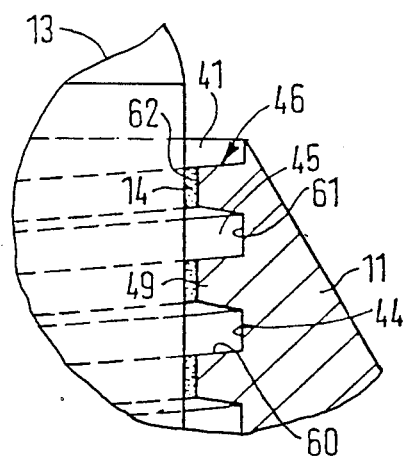
FIG. 6 shows the cross section Z of a fifth embodiment of a cylindrical bit.

In the cylindrical bit (10) as shown in FIG. 6, carrier (11) is of steel, and fluid solder (14) moistens the surfaces of carrier (11) and hard metal part (13). Thread (46) is cut in carrier (11), with ridges (4a) of the thread and grooves (44) forming the depressions. Between the thread ridges (49) and hard metal part (13), a very narrow helical aperture (62) is formed, in which, during soldering, the fluid solder (14) rises, through capillary action, to the upper end of thread (46). The sides of the thread (60) and the thread base (61) are not moistened with solder (14), so that a helical cavity (45) opened upwards is formed in the solder aperture (41), which proceeds to the base level of central bore (12). The base of central bore (12) is completely covered with solder (14). The thread form may be rectangular, trapezoidal, or rounded. The cavity (45) forms the predetermined weak point for the equalization of tension.

Figure 7:
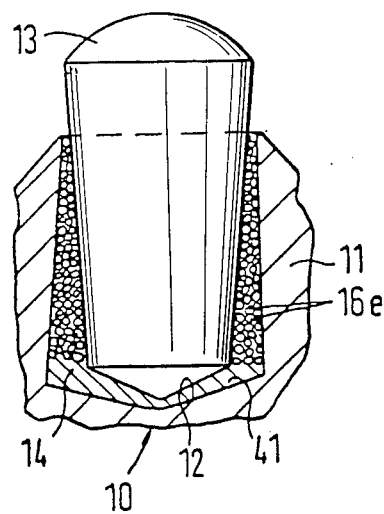
FIG. 7 shows in cross section, a further embodiment of a cylindrical bit.

In the bit shown in FIG. 7, central bore (12) is biconical, as it first expands conically, and then narrows conically. Hard metal part (13) is formed as a peg, likewise biconically, so that solder aperture (41) is formed. Linings (16e) comprise particles or grains, which preferably have a lower specific weight than the solder (14), are more elastic than the solder, and are not bound to the solder (14). The melting temperature of the particles is higher than the melting temperature of the solder (14), which is inserted as powder with the particles in solder aperture (41). By heating up to the melting point of the solder (14), the particles are floatingly embedded in the solder (14), since they can leak out of the narrow place at the upper end of solder aperture (41). The particles form weak points in solder aperture (41), and form openings throughout solder (14), so that an excellent equalization of tension is attained.

Figure 8:
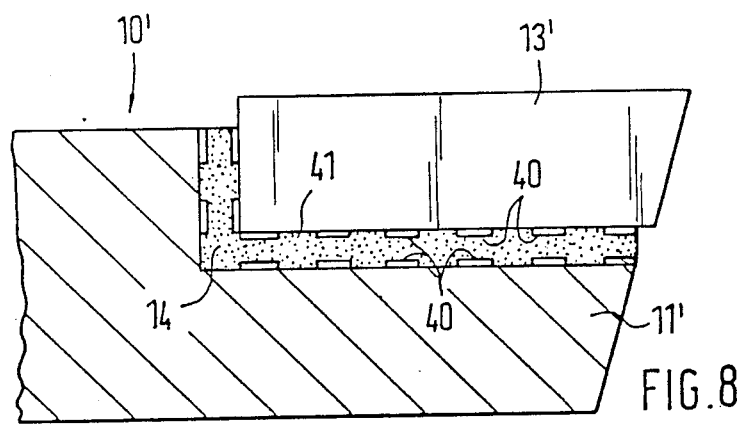
FIG. 8 shows in cross section, an embodiment of a rotatable bit.

Finally, FIG. 8 shows a rotating bit (10'), in which, by means of the solder aperture (41), hard metal part (13') formed as a hard metal plate is solidly connected with the carrier (11'). The surfaces of hard metal part (13') and of carrier (11') are provided, in the area of solder aperture (41) and at places distributed in a predetermined manner, with very thin coatings (40), which do not bind to solder (14). In this manner, a great number of weak points are distributed, evenly or unevenly, over the entire solder aperture (41). Coatings (40) may be provided only on carrier (11'), or, alternatively, only on hard metal part (13'). Silicon carbide (SiC), aluminum oxide ($Al_2O_3$) or other suitable oxide ceramics, yield satisfactory results as a coating (40), which covers at least 20 percent of the solder aperture wall.

We claim:

1. A tool with at least one wear-resistant hard metal part which serves to process production pieces and which is firmly connected to a metallic carrier having a central bore by solder located in at least one solder aperture between said metallic carrier and said hard metal part, the improvement comprising: partial areas of said solder aperture (41) being provided with a surface layer (40) which is non-binding with said solder, and at least one predetermined weak point in said solder aperture (41) formed by non-adhesion of said solder to said partial areas of said solder aperture provided with said surface layer (40).

2. A tool in accordance with claim 1, wherein said at least one predetermined weak point is formed by non-adhesion of said solder to partial areas of said hard metal part 13' provided with said surface layer (40).

3. A tool in accordance with claim 1, wherein said solder (14) is hard solder, having a silver base.

4. A tool in accordance with claim 1, wherein said solder (14) is hard solder, having a copper base.

5. A tool in accordance with claim 1 wherein partial areas of both said carrier (11') and said hard metal part (13') are provided with a surface layer (40) which is non-binding with said solder.

6. A tool in accordance with claim 1 wherein said at least one predetermined weak point is formed by non-adhesion of said solder to partial areas of said carrier (11') which are provided with said surface layer (40).

7. A tool in accordance with claim 1 wherein partial areas of at least one of said carrier (11') and said hard metal part (13') are provided with said surface layer (40) and said at least one predetermined weak point is formed by non-adhesion of said solder to said partial areas of at least one of said carrier (11') and said hard metal part (13').

8. A tool in accordance with claim 1 wherein said solder aperture (41) comprises at least one lining (16, 16e) having at least partial areas provided with said surface layer (40), thereby forming said at least one predetermined weak point in said solder aperture (41) by non-adhesion of said solder to at least partial areas of said lining (16,16e).

9. A tool in accordance with claim 8, wherein said solder (14) is hard solder, having a silver base.

10. A tool in accordance with claim 8, wherein aid solder (14) is hard solder, having a copper base.

11. A tool in accordance with claim 8, wherein said lining (16e) comprises a plurality of particles having surfaces which are non-adhesive with said solder.

12. A tool in accordance with claim 11 wherein said central bore of said metallic carrier is biconical.

13. A tool in accordance with claim 8 wherein said lining (16) comprises a spiral helically coiled band.

14. A tool in accordance with claim 13 wherein said lining extends about 30 to 80 percent of the depth of said central bore.

15. A tool in accordance with claim 13 wherein said lining (16) has a rectangular cross section.

* * * * *